(12) United States Patent
Periaswamy et al.

(10) Patent No.: US 11,200,427 B2
(45) Date of Patent: Dec. 14, 2021

(54) METHODS AND SYSTEMS FOR IMAGE BASED ANOMALY DETECTION

(71) Applicant: YOKOGAWA ELECTRIC CORPORATION, Tokyo (JP)

(72) Inventors: Subramanian Periaswamy, Singapore (SG); Nabil Ahmed Syed, Bellandur Post Bangalore (IN); Sunil Ramana Keri, Bellandur Post Bangalore (IN)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 148 days.

(21) Appl. No.: 16/497,132

(22) PCT Filed: Mar. 29, 2018

(86) PCT No.: PCT/JP2018/013500
§ 371 (c)(1),
(2) Date: Sep. 24, 2019

(87) PCT Pub. No.: WO2018/181837
PCT Pub. Date: Oct. 4, 2018

(65) Prior Publication Data
US 2020/0019790 A1    Jan. 16, 2020

(30) Foreign Application Priority Data

Mar. 31, 2017   (IN) .............................. 201741011616

(51) Int. Cl.
*G06K 9/00*        (2006.01)
*G06K 9/32*        (2006.01)
(Continued)

(52) U.S. Cl.
CPC ....... *G06K 9/00771* (2013.01); *G06K 9/3233* (2013.01); *G06K 9/52* (2013.01);
(Continued)

(58) Field of Classification Search
CPC .... G06K 9/00771; G06K 9/3233; G06K 9/52; G06K 9/6202; G06K 2009/00738; G06T 2207/30241
(Continued)

(56) References Cited

U.S. PATENT DOCUMENTS 9,064,394 B1 *  6/2015  Trundle ........... G08B 13/19695
9,132,352 B1 *  9/2015  Rabin ..................... A63F 13/57
(Continued)

FOREIGN PATENT DOCUMENTS

WO        WO 00/23959        4/2000

OTHER PUBLICATIONS

Weiming Hu et al., "A Survey on Visual Surveillance of Object Motion and Behaviors", IEEE Transactions on Systems, Man, and Cybernetics—Part C: Applications and Reviews, Aug. 1, 2004, pp. 334-352, vol. 34, No. 3.
(Continued)

*Primary Examiner* — Ali Bayat
(74) *Attorney, Agent, or Firm* — Sheridan Ross P.C.

(57) ABSTRACT

The invention provides methods, systems and computer program products for image based detection of occurrence of an anomalous event within a process environment. Detection of occurrence of an anomalous event comprises (i) receiving a first set of information from a first image acquisition device, (ii) analyzing the first set of information for determining whether the first image frame images an occurrence of an anomalous event, (iii) receiving a second set of information generated at a second device, wherein the second set of information represents a state of the process environment, (iv) analyzing the second set of information for determining whether an anomalous event has occurred,
(Continued)

and (v) generating an anomaly identification decision based at least on output from analysis of the second set of information.

17 Claims, 9 Drawing Sheets

(51) Int. Cl.
  *G06K 9/52* (2006.01)
  *G06K 9/62* (2006.01)
(52) U.S. Cl.
  CPC . *G06K 9/6202* (2013.01); *G06K 2009/00738* (2013.01); *G06T 2207/30241* (2013.01)
(58) Field of Classification Search
  USPC .......................................................... 382/103
  See application file for complete search history.

(56) References Cited

U.S. PATENT DOCUMENTS

| | | | |
|---|---|---|---|
| 10,909,826 B1* | 2/2021 | Solh ................. | G08B 13/19608 |
| 2006/0053342 A1* | 3/2006 | Bazakos ............ | G08B 21/0423 |
| | | | 714/37 |
| 2008/0043106 A1* | 2/2008 | Hassapis ............ | G08B 13/1961 |
| | | | 348/153 |
| 2008/0317356 A1* | 12/2008 | Itoh .................. | G08B 13/19643 |
| | | | 382/209 |
| 2009/0245573 A1* | 10/2009 | Saptharishi ............ | H04N 7/181 |
| | | | 382/103 |
| 2015/0092052 A1* | 4/2015 | Shin ................... | G06K 9/00771 |
| | | | 348/143 |

OTHER PUBLICATIONS

International Search Report for PCT/JP2018/013500 dated Jul. 6, 2018 [PCT/ISA/210].

* cited by examiner

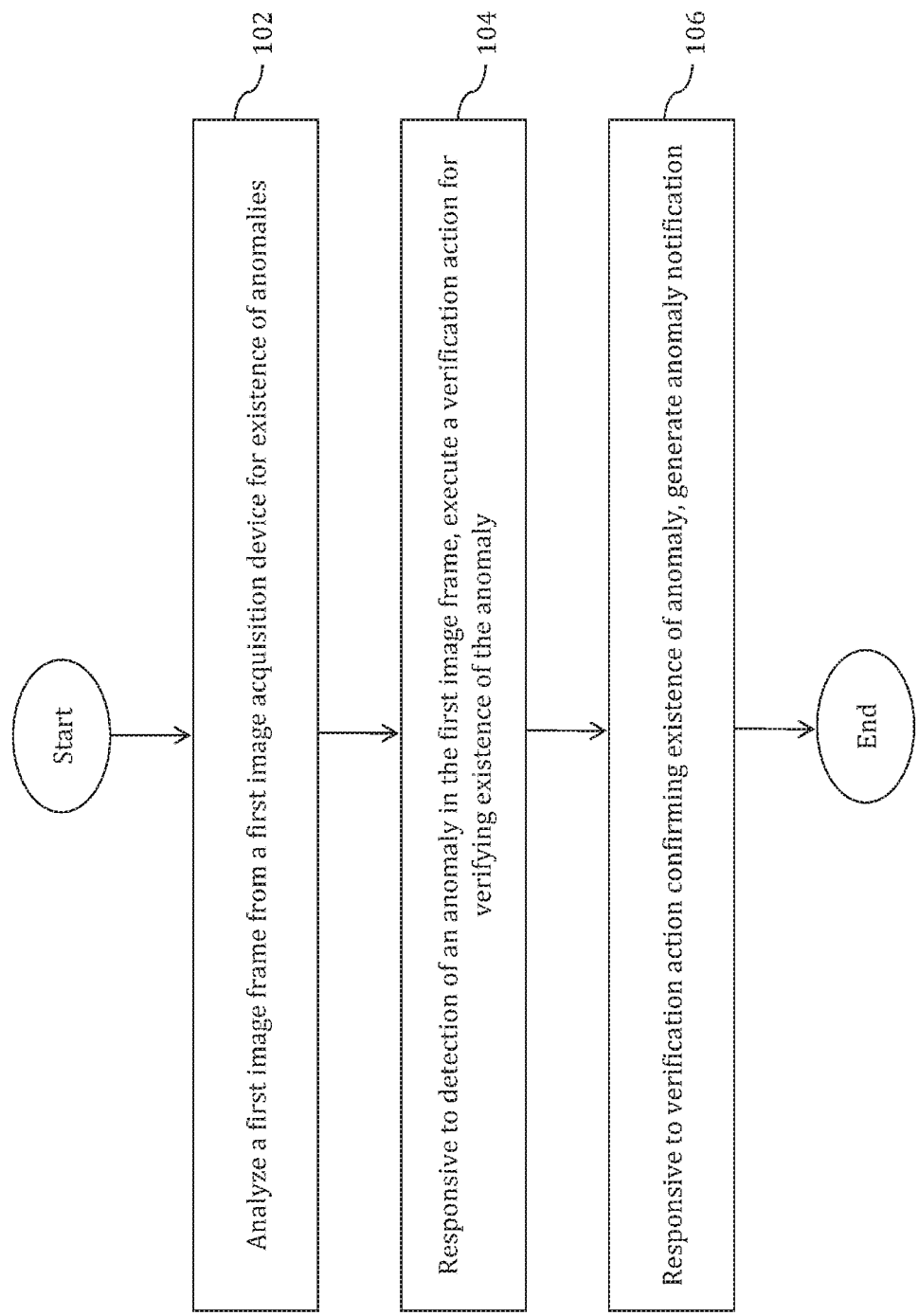
[Fig. 1]

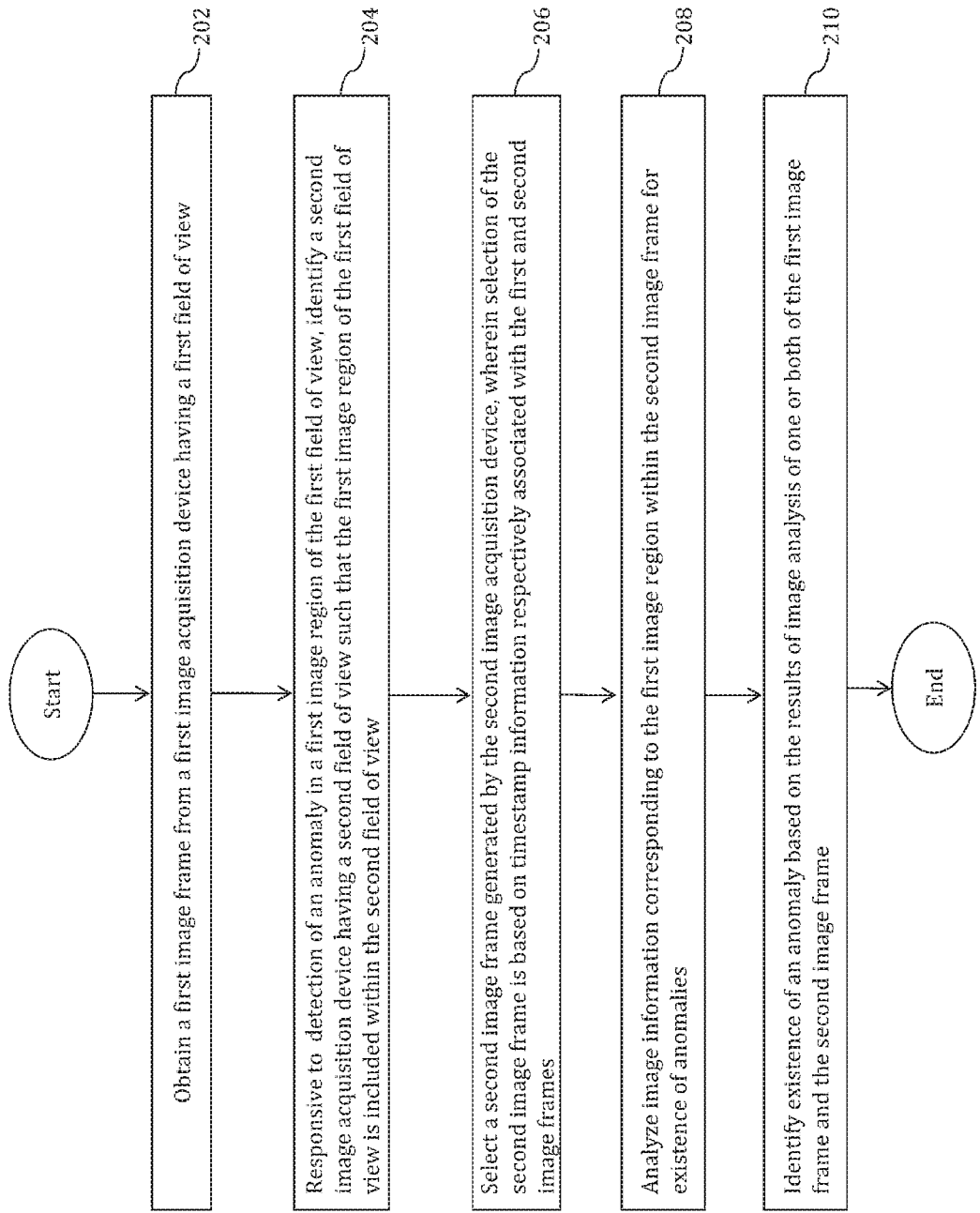
[Fig. 2]

[Fig. 3]
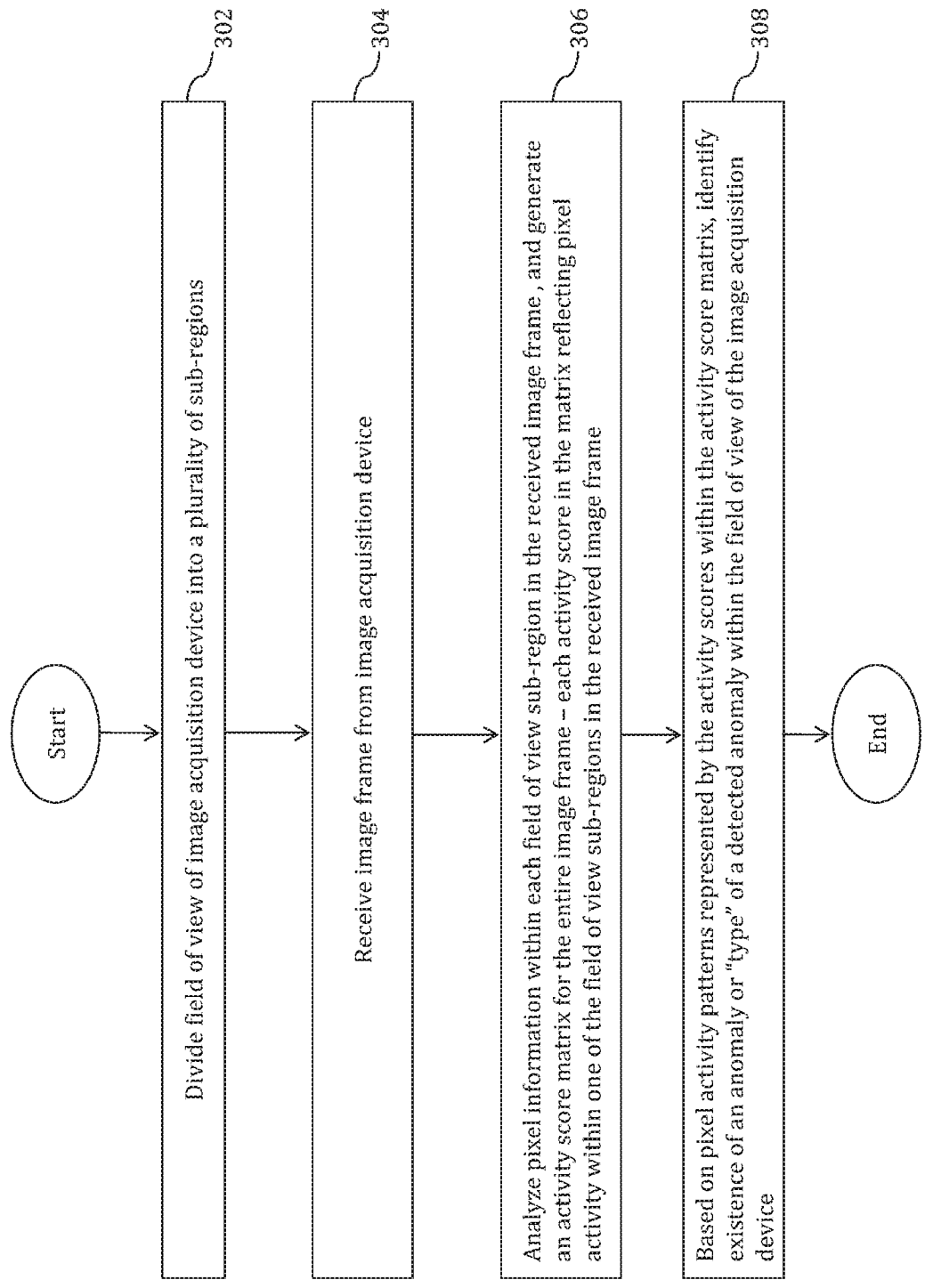

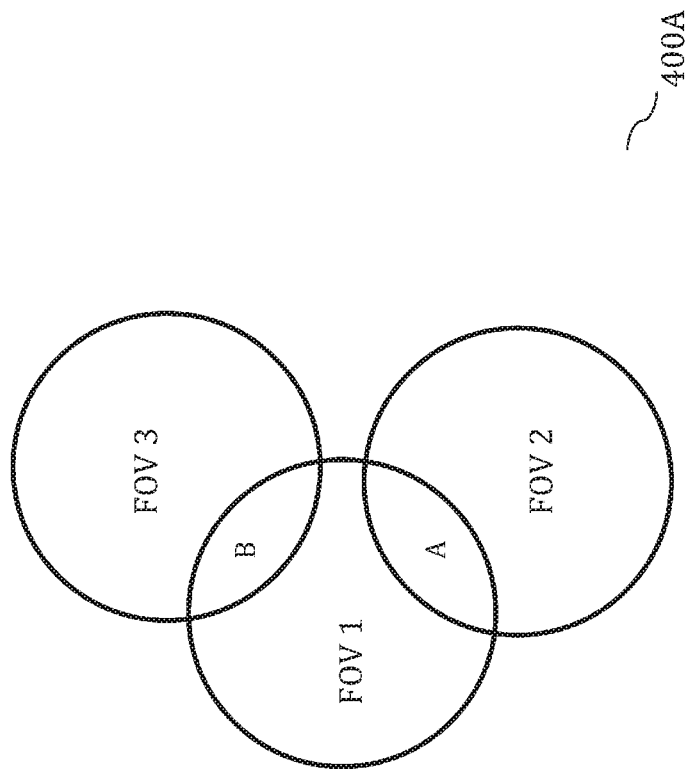
[Fig. 4A]

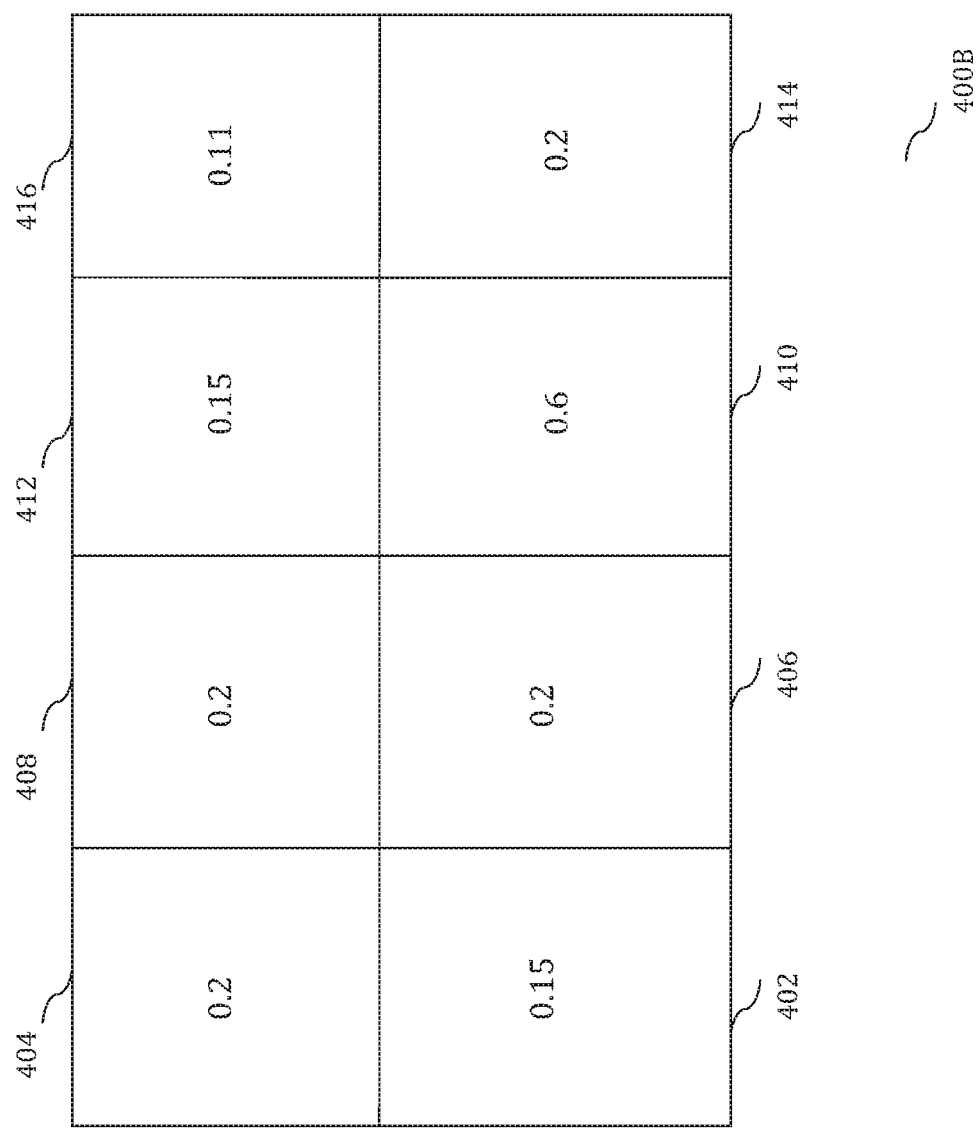
[Fig. 4B]

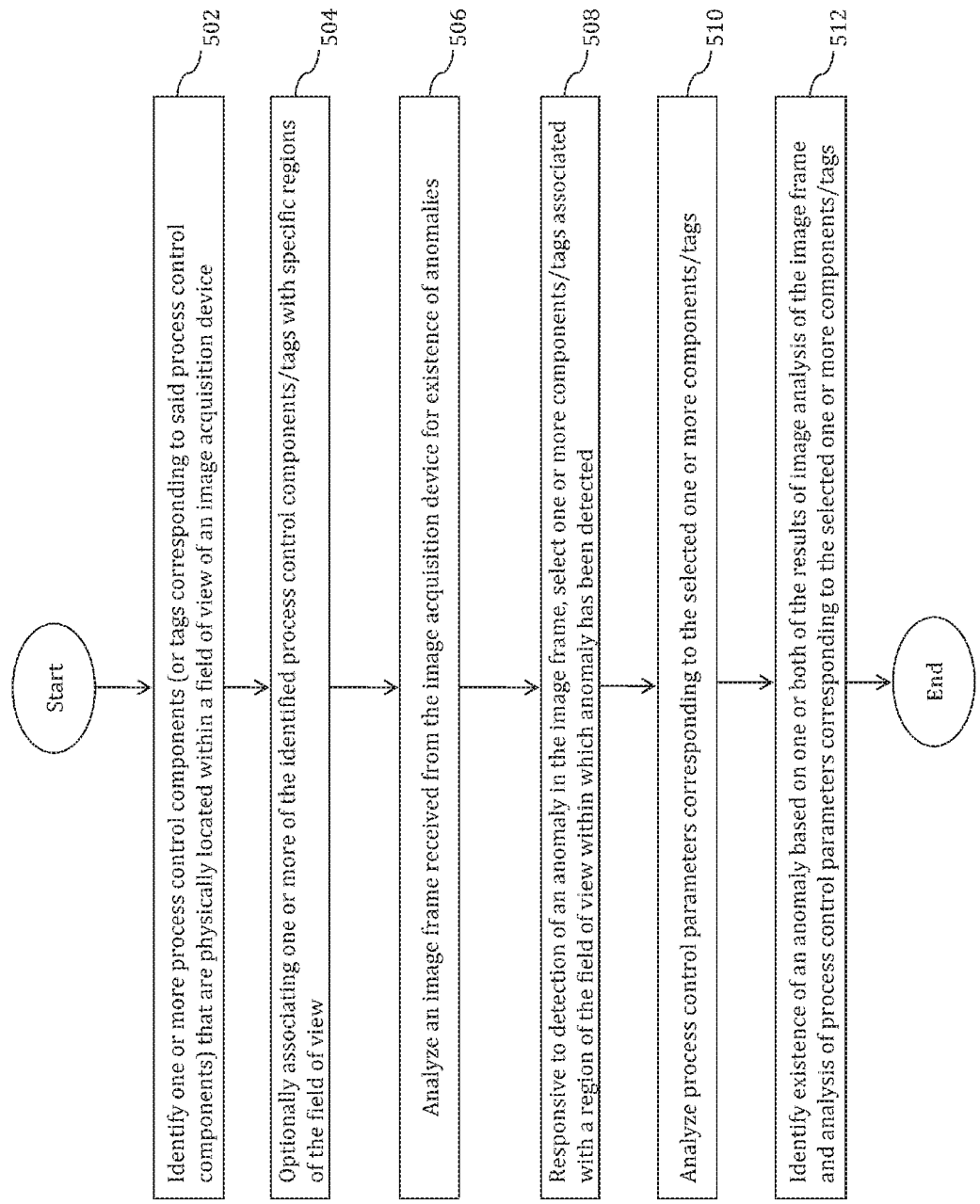
[Fig. 5]

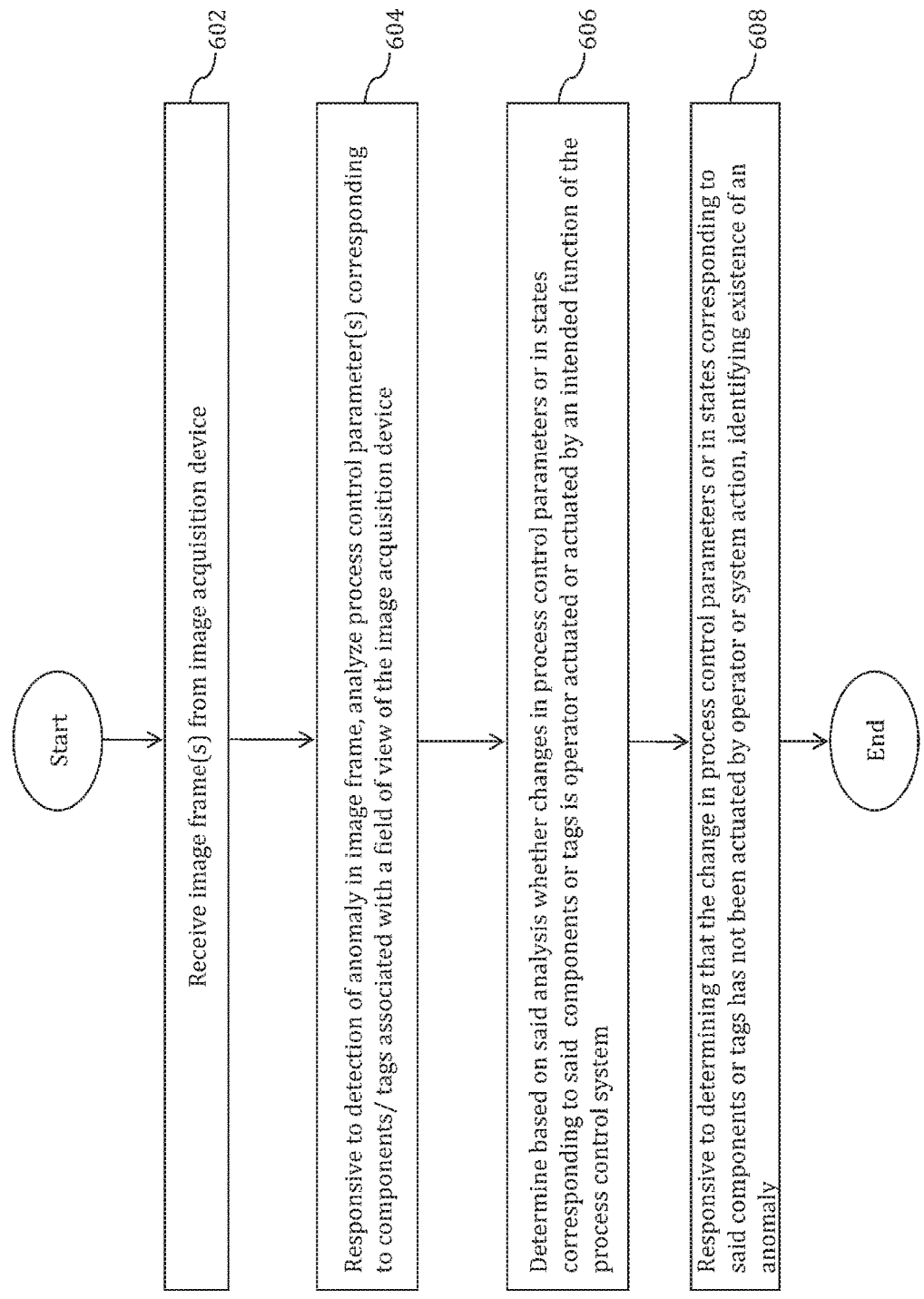
[Fig. 6]

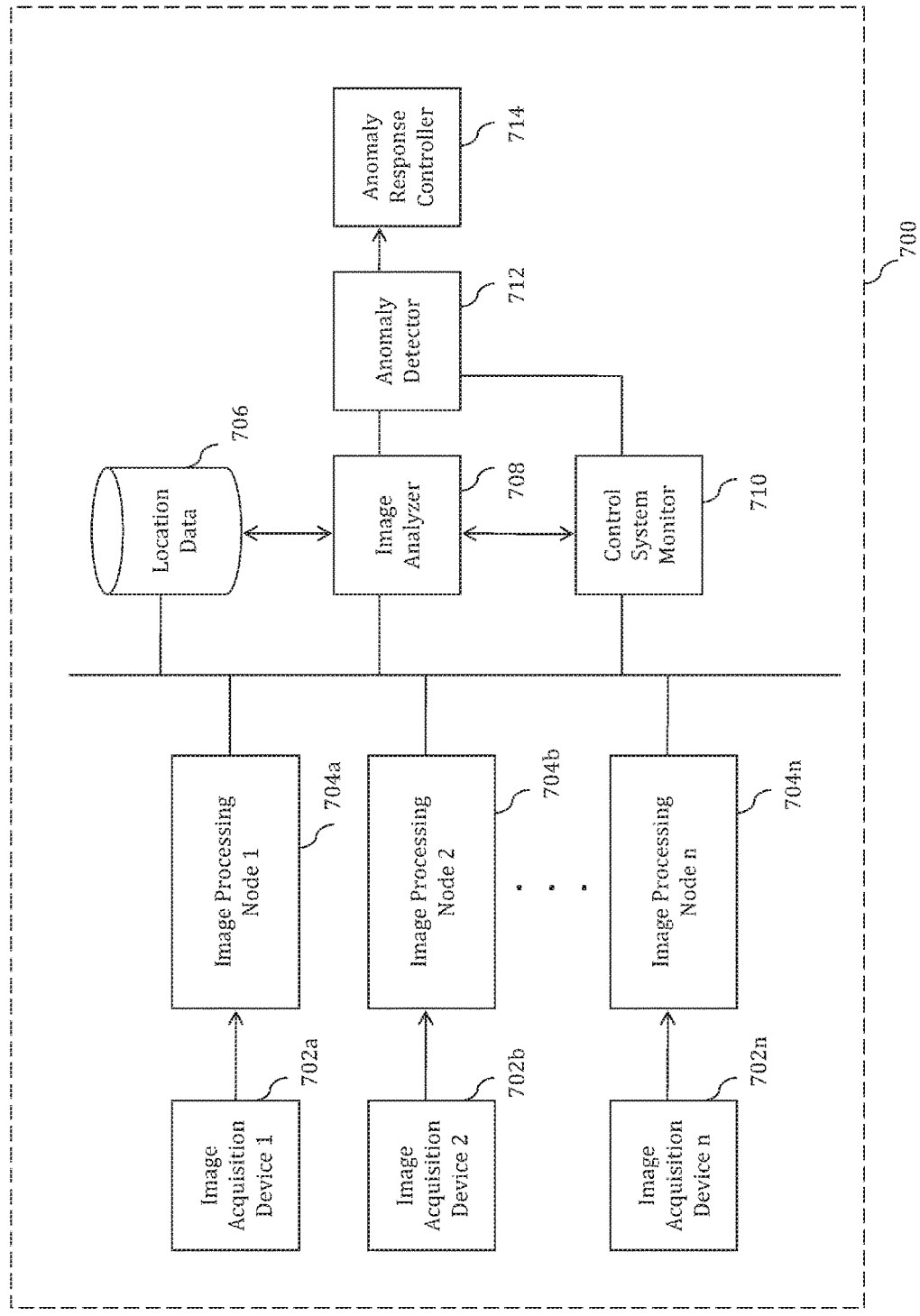
[Fig. 7]

METHODS AND SYSTEMS FOR IMAGE BASED ANOMALY DETECTION

CROSS REFERENCE TO RELATED APPLICATIONS

This application is a National Stage of International Application No. PCT/JP2018/013500 filed Mar. 29, 2018, claiming priority based on Indian Patent Application No. 201741011616 filed Mar. 31, 2017, the entire contents of each of which are herein incorporated by reference in their entireties.

TECHNICAL FIELD

The invention relates to the detection of anomalies within process environments such as industrial plants or other premises. In particular, the invention enables detection of anomalies or anomalous events, based on processing and analysis of images received from one or more image acquisition devices.

BACKGROUND ART

Surveillance of industrial plants or other process environments for occurrence of anomalies is a routine requirement that is necessary to ensure that the plant or process environment remains in an optimal or functional state.

Such surveillance enables timely initiation of preventive maintenance or remedial action in response to detection of an anomaly or detection of an unexpected or undesirable change in system state.

Typical solutions for surveillance and anomaly detection within process environments involves manual inspections by field operators. Such solutions rely on availability of field operators, and anomaly detection occurs when a field operator is able to visually observe and identify the anomaly—which presents difficulties for realtime plant wide anomaly detection.

One solution to achieve more consistent and continuous anomaly detection is to use vision based systems (i.e. camera based solutions) to detect anomalies within an industrial plant. The solution involves receiving images from security cameras or other cameras positioned at various locations within a plant, and running image processing algorithms on received images for identifying anomalous events. Detection of an anomalous event may trigger alerts or alarms for preventive maintenance or remedial action.

The image processing algorithms may involve any one or more algorithms for processing image data or pixel data extracted from an image and for identifying (based on the image data or pixel data) existence of any unexpected system state or behavior, or for identifying any deviations from an expected state or event—and may in certain cases involve processing the image data or pixel data using neural networks that have been trained to identify anomalous states or anomalous system behavior. Training of neural networks to recognize anomalous states or behavior may be achieved by training such networks using training data sets comprising images that have already been classified as corresponding to anomalous states or behavior. Through such training, the weights of processing nodes within the neural networks may be iteratively adjusted based on the training data sets, until the recognition accuracy of the neural network reaches a desired minimum accuracy.

In use, neural networks receive and process image information received from the one or more imaging devices, and output a confidence score indicating the likelihood that the image information corresponds to an anomalous state or event. Responsive to receiving a confidence score that satisfies one or more predefined scoring requirements, it may be determined that a specific image or set of images includes image information corresponding to an anomalous event or state, and such images may be displayed on a human-machine interface (HMI) display, optionally highlighting a particular region in which the anomaly has been detected.

A problem with image analysis based anomaly detection is that in certain cases, image processing algorithms may be unable to conclusively determine whether image information relates to an anomalous event. There may be multiple reasons for this, including unfavorable positioning of the camera, lack of sufficient optical resolution, insufficient focus, insufficient zoom capabilities of the camera, insufficient pixel resolution, or presence of one or more objects between the imaging device and the anomalous event so as to obscure part of the anomalous event from the camera. Additionally, despite the presence of multiple cameras in a plant, there are no solutions for a cohesive and integrated approach in analyzing information from multiple cameras as a means to improve detection of anomalous events.

SUMMARY OF INVENTION

Technical Problem

The present invention attempts to address these and other problems.

Solution to Problem

The invention provides a method for image based detection of occurrence of an anomalous event within a process environment. The method comprises the steps of (i) receiving a first set of information from a first image acquisition device configured to image at least a part of the process environment, the first set of information comprising image information extracted from a first image frame generated at the first image acquisition device, (ii) analyzing the first set of information for determining whether the first image frame images an occurrence of an anomalous event, (iii) responsive to determining that the first image frame images an occurrence of an anomalous event (a) receiving a second set of information generated at a second device, wherein the second set of information represents a state of the process environment, and (b) analyzing the second set of information for determining whether an anomalous event has occurred, and (iv) generating an anomaly identification decision based at least on output from analysis of the second set of information.

In an method embodiment, (i) analysis of the first set of information outputs a first score, (ii) analysis of the second set of information outputs a second score, and (iii) the generated anomaly identification decision is based on both of the first and second scores.

Selection of the second set of information may be based on timestamps respectively associated with the first set of information and the second set of information.

The second device may in an embodiment comprise a second image acquisition device configured to image at least a part of the process environment. The first image acquisition device may have a first field of view and the second image acquisition device may have a second field of view, such that said first field of view and said second field of view intersect at a field of view overlap region. The second set of information may comprise image information extracted from a second image frame generated at the second image acquisition device. Analysis of the second set of information for determining an occurrence of an anomalous event may comprise determining whether the second image frame images occurrence of an anomalous event within the field of view overlap region.

At least the second image acquisition device may be selectively operable within one of a first anomaly detection configuration and a second anomaly detection configuration. A first anomaly detection score requirement associated with the first anomaly detection configuration may be selectively higher than a second anomaly detection score requirement associated with the second anomaly detection configuration.

In a method embodiment, the second image acquisition device is configured to implement the second anomaly detection configuration responsive to a determination that the first image frame images occurrence of an anomalous event.

The second device may comprise a sensor configured to measure state changes corresponding to at least one process control parameter within the process environment. The second set of information may comprise state change information received from the sensor. Analysis of the second set of information for determining whether an anomalous event has occurred, may comprise analysis of measured state changes corresponding to the at least one process control parameter.

In an embodiment of the method, analysis of the first set of information includes one or more of trajectory analysis, object based analysis, pixel based analysis, and comparison of the first set of information with data received from combustible gas sensors, photoionization detectors or electrochemical sensors.

Analysis of any of the first set of information or the second set of information may include analyzing pixel information within a plurality of sub-regions within an image frame under analysis, and generating a pixel activity score for each of the plurality of sub-regions.

According to an embodiment of the method, pixel activity scores corresponding to the plurality of sub-regions are recorded within an activity score matrix. Generating the anomaly identification decision is based on pixel activity scores corresponding to one or more of the plurality of sub-regions within the activity score matrix.

The method may also include generating the anomaly identification decision based on a determination whether a detected anomalous event is influenced by an operator actuated event or process control system actuated event.

The invention additionally relates to a system for image based detection of occurrence of an anomalous event within a process environment. The system comprises
(i) at least one processor, (ii) at least one processor implemented analyzer configured to:
(a) receive a first set of information from a first image acquisition device configured to image at least a part of the process environment, the first set of information comprising image information extracted from a first image frame generated at the first image acquisition device, (b) analyze the first set of information for determining whether the first image frame images an occurrence of an anomalous event, (c) responsive to determining that the first image frame images an occurrence of an anomalous event (1) receive a second set of information generated at a second device, wherein the second set of information represents a state of the process environment, and (2) analyze the second set of information for determining whether an anomalous event has occurred, and (iii) an anomaly detector configured to generate an anomaly identification decision based at least on output from analysis of the second set of information.

In an embodiment of the system, (i) the at least one processor implemented analyzer is configured such that (a) analysis of the first set of information outputs a first score, and (b) analysis of the second set of information outputs a second score, and (ii) and the anomaly detector is configured such that the generated anomaly identification decision is based on both of the first and second scores.

The at least one processor implemented analyzer may be configured such that selection of the second set of information is based on timestamps respectively associated with the first set of information and the second set of information.

The second device may comprise a second image acquisition device configured to image at least a part of the process environment. The first image acquisition device may have a first field of view and the second image acquisition device may have a second field of view, such that said first field of view and said second field of view intersect at a field of view overlap region; and The at least one processor implemented analyzer may be configured such that (i) the second set of information comprises image information extracted from a second image frame generated at the second image acquisition device, and (ii) analysis of the second set of information for determining an occurrence of an anomalous event comprises determining whether the second image frame images occurrence of an anomalous event within the field of view overlap region.

At least the second image acquisition device may be selectively operable within one of a first anomaly detection configuration and a second anomaly detection configuration. A first anomaly detection score requirement associated with the first anomaly detection configuration is selectively higher than a second anomaly detection score requirement associated with the second anomaly detection configuration.

The second image acquisition device may be configured to implement the second anomaly detection configuration responsive to a determination that the first image frame images occurrence of an anomalous event.

The second device may comprise a sensor configured to measure state changes corresponding to at least one process control parameter within the process environment. The at least one processor implemented analyzer may be configured such that (i) the second set of information comprises state change information received from the sensor, and (ii) analysis of the second set of information for determining whether an anomalous event has occurred, comprises analysis of measured state changes corresponding to the at least one process control parameter.

In an embodiment of the system, the at least one processor implemented analyzer is configured such that analysis of the first set of information includes one or more of trajectory analysis, object based analysis, pixel based analysis, and comparison of the first set of information with data received from combustible gas sensors, photoionization detectors or electrochemical sensors.

The at least one processor implemented analyzer may be configured such that analysis of any of the first set of information or the second set of information includes analyzing pixel information within a plurality of sub-regions within an image frame under analysis, and generating a pixel activity score for each of the plurality of sub-regions.

The at least one processor implemented analyzer may in an embodiment be configured such that pixel activity scores corresponding to the plurality of sub-regions are recorded within an activity score matrix. The anomaly detector may be configured such that generating the anomaly identification decision is based on pixel activity scores corresponding to one or more of the plurality of sub-regions within the activity score matrix.

The anomaly detector may be configured such that generating the anomaly identification decision is additionally based on a determination whether a detected anomalous event is influenced by an operator actuated event or process control system actuated event.

The invention additionally relates to a computer program product for image based detection of occurrence of an anomalous event within a process environment, the computer program product comprising a non-transitory computer readable medium having computer readable program code embodied thereon. The computer readable program code may comprise instructions for (i) receiving a first set of information from a first image acquisition device configured to image at least a part of the process environment, the first set of information comprising image information extracted from a first image frame generated at the first image acquisition device, (ii) analyzing the first set of information for determining whether the first image frame images an occurrence of an anomalous event, (iii) responsive to determining that the first image frame images an occurrence of an anomalous event (a) receiving a second set of information generated at a second device, wherein the second set of information represents a state of the process environment, and (b) analyzing the second set of information for determining whether an anomalous event has occurred, and (iv) generating an anomaly identification decision based at least on output from analysis of the second set of information.

BRIEF DESCRIPTION OF DRAWINGS

FIG. 1 illustrates a flowchart for image based anomaly detection.

FIG. 2 illustrates a method for verifying the existence of a detected anomaly based on image feeds from two image acquisition devices.

FIG. 3 comprises a flowchart describing a specific method of analyzing image information for detecting anomalies.

FIG. 4A illustrates an exemplary arrangement of overlapping fields of views of multiple image acquisition devices.

FIG. 4B provides an illustrative activity score matrix generated based on an image received from an image acquisition device.

FIG. 5 illustrate exemplary methods for verifying image based determinations of an anomalous event.

FIG. 6 illustrate exemplary methods for verifying image based determinations of an anomalous event.

FIG. 7 illustrates an exemplary process environment configured to implement the methods of the present invention.

DESCRIPTION OF EMBODIMENTS

Figure 8:
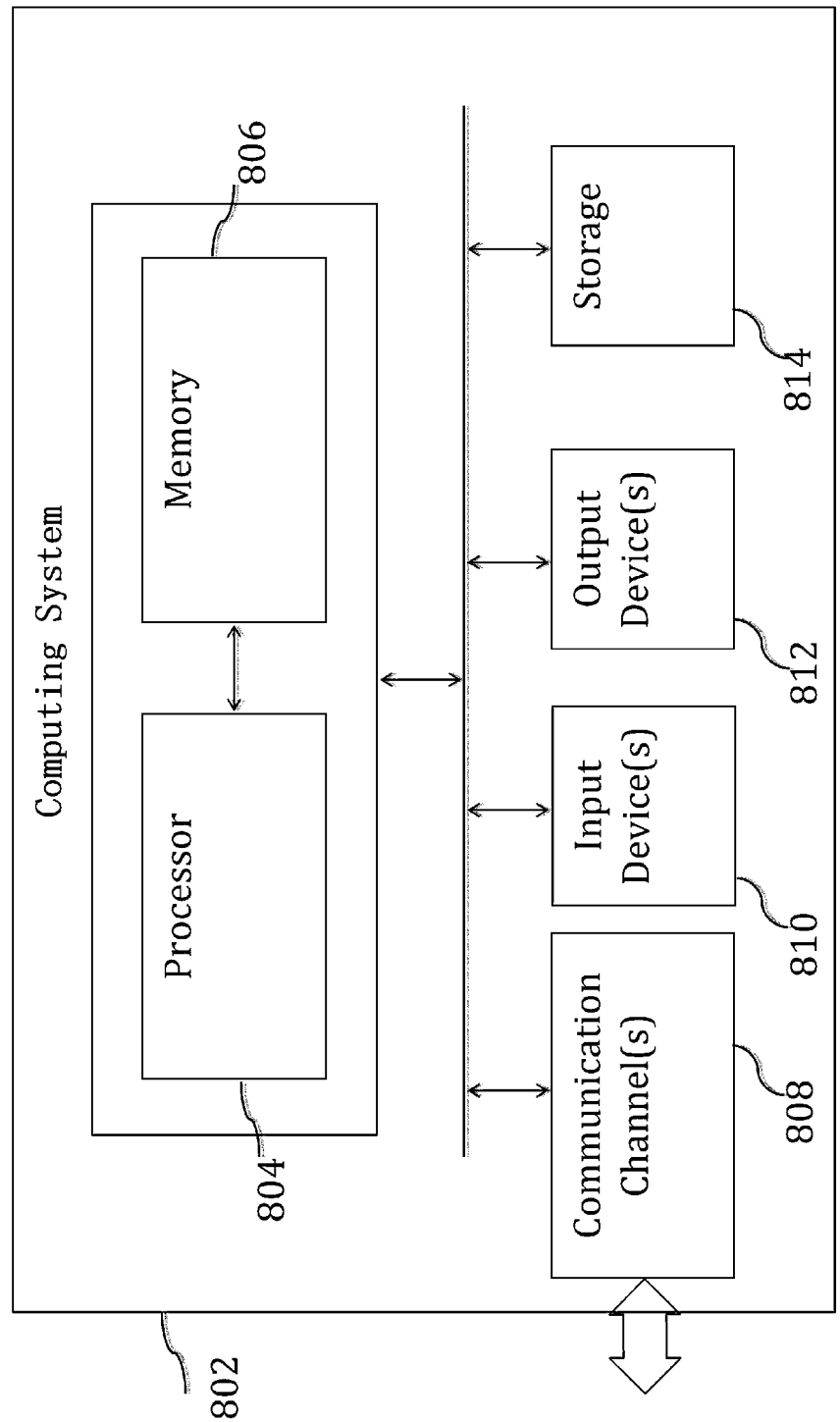
FIG. 8 illustrates an exemplary computing system in which various embodiments of the invention may be implemented.

The present invention provides methods, systems and computer program products for image based or image feed based anomaly detection, for example within an industrial plant or other industrial premises. The invention enables combining of results of image analysis and enables processing of image feeds from multiple imaging devices, and in an embodiment, also enables combining of image analysis with feedback or data received from one or more control system components within a process control system—with a view to improve the accuracy of anomaly detection.

For the purposes of the present invention, the term "anomaly" or "anomalous event" shall be understood as referring to an event or state that deviates from or fails to conform to an expected or desirable process state or component state within a process environment. Exemplary instances of anomalies that may be typically observed in process environments such as industrial plants include leakages of liquids or gas, overflows, spilling of materials, oil leaks, steam leaks, unexpected failure of one or more components, physical damage to equipment, fire, smoke and unacceptable drops or spikes in temperature or pressure, deviation from safety standards or from regulatory compliance requirements, and unexpected or suspicious human or machine activity.

For the purposes of the present invention, the term "control system parameter(s)" shall be understood as referring to one or more parameters whose determinable values may be used as indicators of state of control system and/or control operations.

For the purposes of the present invention, the term "field of view" or "angular field of view" shall refer to the solid angle through which an image acquisition device is sensitive to electromagnetic radiation. Stated differently, said term(s) refer to an angular volume that is capable of being imaged by an image acquisition device (or by an image sensor or imaging substrate within said image acquisition device).

For the purposes of the present invention, the term "image acquisition device" shall be understood as referring to any device capable of acquiring images in any region of the electromagnetic spectrum including the ultraviolet, visible light, near infrared, or infrared spectrums, and includes digital cameras, video cameras, infrared cameras, surveillance cameras, image sensors capable of generating a digital image, and thermal imagers.

For the purposes of the present invention, the term "tag" shall be understood as an identifier that is directly or indirectly associated with a particular function block within a control system, and which may be used to access a particular function block within a control system. In control systems such as distributed control systems (DCS) or supervisory control and data acquisition (SCADA) systems, a tag may comprise a unique name, variable or memory address which may be used to access or control a component or function block to which the tag has been assigned. Tags associated with physical components within a control system may be referred to as "physical tag(s)", while tags associated with data variables, calculations, or logical or sequential operations (and which do not identify a physical component) may be referred to as "virtual tag(s)".

FIG. 1 illustrates a method of image based anomaly detection in accordance with the present invention.

Step 102 comprises analyzing a first image frame received from a first image acquisition device—wherein the image analysis is directed towards determining whether said first image frame includes image information that indicates or establishes the existence of an anomaly within the field of view of an image acquisition device.

The image analysis of said first image frame may be implemented based on any one or more image analysis algorithms, and may in an embodiment involve processing of image information using one or more neural networks configured to detect or identify anomalies. In various embodiments of the invention, one or more different approaches may be implemented for the purposes of anomaly detection—including trajectory analysis, object-based image recognition, and pixel based image analysis. It has been found that particularly in the case of plant safety surveillance, analysis of color and texture characteristics of individual image pixels and/or regions or sub-regions of image pixels within an image frame results in more effective identification of anomalies in comparison with object-based representations. For example, motion detected across adjacent pixels and the direction of motion has been found to be particularly effective for identifying anomalies such as steam leaks or other fluid leaks. The image recognition systems may be modeled using region—based decomposition techniques. Typically, such techniques involve analyzing individual sub-regions of a field of view corresponding to an image acquisition device in a divide and conquer approach for the purposes of activity modeling.

It would be understood that image analysis of image frames for the purposes of the present invention may be preceded by suitable image preprocessing steps, including noise filtering, cropping, resizing, de-sizing, sub-sampling etc. of such image frames.

The image analysis at step 102 may in an embodiment also include determining or calculating a score or other indication (for example a confidence score) that indicates or identifies the likelihood that the anomaly detection is accurate (i.e. the likelihood that the image information that has been interpreted as representative of anomaly, is in fact representative of a genuine anomaly). In a further embodiment, such confidence score may be compared against a predefined minimum value, and the first image frame may be flagged as including image information representing an anomaly, only in cases where the confidence score exceeds said predefined minimum value.

Responsive to identification or detection of an anomaly based on the image analysis of the first image frame, step 102 may result in generation or communication of a notification, flag or alert regarding detection of an anomaly within the first image frame.

At step 104, responsive to detection of an anomaly within the first image frame, the method executes a verification action for verifying the existence of an anomaly. In an embodiment of the invention a verification action or verification analysis may be triggered in cases where (i) a confidence score associated with the anomaly detection at step 102 is lower than a predefined minimum value, or (ii) a confidence score associated with the anomaly detection at step 102 falls within a predefined range of values. While specific embodiments of the verification analysis (and the manner in which the results of such verification analysis may be interpreted) are discussed in more detail below, for the purposes of the present invention, the verification analysis shall be understood to comprise one or both of image analysis based verification and control system parameter based verification.

Step 106 comprises generating an anomaly notification or an anomaly confirmation in response to the results of the verification analysis (at step 104) confirming the existence of the anomaly previously detected at step 102.

FIG. 2 illustrates an embodiment of the invention, wherein anomaly detection and verification of said anomaly detection are both based on image analysis.

Step 202 of FIG. 2 comprises obtaining or receiving a first image frame from a first image acquisition device—wherein said first image acquisition device has a first field of view.

Responsive to detection of an anomaly in a first image region of the first field of view, step 204 comprises identifying a second image acquisition device having a second field of view such that the first image region of the first field of view is also included within the second field of view.

Step 204 is premised on arrangements of multiple image acquisition devices respectively covering different fields of view within premises being monitored—wherein two or more of the image acquisition devices may have partially overlapping fields of view.

Reference may be had to FIG. 4A which illustrates region 400A that is under surveillance by three image acquisition devices, respectively having fields of view FOV1, FOV2 and FOV3. As illustrated in FIG. 4A, field of views FOV1 and FOV2 partially overlap—wherein the overlap creates a first overlap region A. Similarly, field of views FOV1 and FOV3 partially overlap such that the overlap creates second overlap region B.

Assuming for the purpose of an illustrative example that method step 202 resulted in obtaining a first image frame from a first image acquisition device having field of view FOV1, and further that an anomaly was detected within an image region falling within region A of field of view FOV1, step 204 would result in identification of a second image acquisition device having field of view FOV2 since field of view FOV2 also includes the image region A within which an anomaly has been detected. Stated differently, the objective of step 204 is to identify a second camera or image acquisition device that has a field of view which covers the region in which the first camera or image acquisition device has already detected an anomaly—so that image frames from the second device can be used for anomaly verification purposes.

The identification of image acquisition devices having overlapping fields of view may be achieved by consulting or referring to a predefined mapor correlation chart of fields of view of various imaging devices. In an embodiment of the invention, the predefined mapping or correlation may be implemented at the time of system configuration or engineering. In embodiment of the invention, multiple image acquisition devices and/or their corresponding image processors or image processing nodes may be communicatively coupled in a peer to peer arrangement—wherein responsive to detection of an anomaly within a field of view of any one image acquisition device, said image acquisition device or associated processing node searches for and identifies at least one other image acquisition device configured to image an image region within which the anomaly has been detected by the first image acquisition device.

In an embodiment of the invention, die first image acquisition device and the second image acquisition device may have different fields of view, different pixel resolutions, different focus settings, different optical zoom settings, different digital zoom settings, different exposure settings, different filter arrangements interposed between their corresponding image sensors and fields of view, different angular fields of view, different pan or tilt capabilities or settings, and/or different sensitivity to electromagnetic radiation. It has been found that in the event the first and second image acquisition devices are different in one or more of the above respects, the likelihood of improvements in accuracy of anomaly detection as a result of the method of FIG. 2 may increase.

At step 206, a second image frame generated by the second image acquisition device is selected, wherein selection of the second image frame is based on timestamp information respectively associated with the first and second image frames. In an embodiment the second image frame is selected based on ascertaining that the time difference between a first timestamp associated with the first image frame and a second timestamp associated with the second image frame is less than a predefined maximum value. In an embodiment, the second image frame is acquired by the second imaging device at the same or substantially the same time that the first image frame is acquired by a first imaging device. In another embodiment, the timestamp associated with the second image frame is chronologically separated from the timestamp associated with the first image frame by more than a predefined minimum value, and by less than a maximum predefined value.

Step 208 comprises analyzing image information corresponding to the first image region within the second image frame for existence of anomalies. At step 210, the existence of an anomaly or an anomalous event occurring within the first image region is determined or confirmed based on the results of image analysis of one or both of the first image frame and the second image frame.

In a specific embodiment of the invention, each image acquisition device may be selectively operable in either a first anomaly detection configuration and a second anomaly detection configuration, wherein the first anomaly detection configuration and the second anomaly detection configuration are different from each other (i.e. are mutually distinct or distinguishable). In an exemplary embodiment, the first anomaly detection configuration may comprise a requirement for a first minimum confidence score or a first minimum pixel activity score, while the second anomaly detection configuration may comprise a requirement for a second minimum confidence score or a second minimum pixel activity score, such that the second minimum confidence score/second minimum pixel activity score is lower than the first minimum confidence score/second minimum pixel activity score. In an embodiment of the method more generally described in FIG. 2 (i) detection of an anomaly in an image frame received from an image acquisition device in accordance with step 202 is based on the first anomaly detection method (i.e. the higher set of requirements), whereas (ii) detection of an anomaly within an image frame received from the same image acquisition device in accordance with step 208 is based on the second anomaly detection method (i.e. the lower set of requirements).

In an embodiment of the invention, step 210 results in identification of an anomaly entirely on the basis of detection of an anomaly at step 208. In another embodiment, identification of an anomaly at step 210 may involve combining the results of the anomaly detection based on the first image frame and anomaly detection based on the second image frame. In a specific embodiment, identification of an anomaly at step 210 may involve a combination of first and second confidence scores respectively resulting from anomaly analysis of the first and second image frames, wherein the step of combining said first and second confidence scores and interpreting the combined results may be based on a predefined set of rules for combining confidence scores or interpreting results of two or more confidence scores. In an embodiment, anomaly analysis for the purposes of step 210 (i.e. for identification of an anomaly at step 210) may include cross correlation of confidence scores over a period of time.

For the purposes of the method of FIG. 2, it would be understood that any of the methods of image analysis based anomaly detection that are discussed above, may be implemented for either or both of analysis of the first image frame and analysis of the second image frame. FIG. 3 illustrates an exemplary embodiment of method steps that may be involved in such image analysis based anomaly detection.

Step 302 of FIG. 3 comprises dividing the field of view of an image acquisition device into a plurality of sub-regions. In an embodiment, the division into a plurality of sub-regions may be achieved by implementing division or classification instructions on a frame-by-frame basis on each image frame received from the image acquisition device.

Step 304 comprises receiving an image frame from an image acquisition device. Step 306 thereafter involves analyzing pixel information within each sub-region in the received image frame—and generating an activity score for each sub-region. The activity score for each sub-region is an image analysis based score of activity (for example motion, movement or state change) detected within said sub-region. The determined activity scores for the plurality of sub-regions within an image frame are used to generate an activity score matrix for the entire image frame.

FIG. 4B illustrates an exemplary activity score matrix 400B of a type that could be generated at step 306. As illustrated, the activity score matrix 400B of FIG. 4B comprises a plurality of activity scores, each corresponding to one of image frame sub-regions 402 to 414. In the exemplary activity score matrix 400B, it would be observed that image frame sub-region 410 has a significantly higher activity score (0.6) in comparison with the remaining image frame sub-regions 402 to 408 and 412 to 416 (which scores respectively range between 0.11 and 0.2). The significantly higher activity score generated based on pixel activity analysis indicates detection of an observable/visually detectable state change within image sub-region 410.

Step 308 thereafter comprises identification of existence of an anomaly or identification of "type" of a detected anomaly within an image sub-region which identification may in an embodiment be based on algorithmic or neural network based processing of one, more or all of the activity scores within the activity score matrix.

The results of the anomaly detection in accordance with steps 302 to 308 may be implemented in connection with any of the anomaly detection steps discussed in connection with FIGS. 1 and 2 above, or in connection with FIGS. 5 and 6 below.

FIG. 5 illustrates a method of image analysis based anomaly detection, wherein verification of an anomaly detected using image analysis is achieved based on analysis of control system parameters.

Step 502 of the method comprises identifying one or more components of a process control system (for example a DCS or SCADA system) that are physically located within a field of view (or within a defined vicinity of the field of view) of an image acquisition device, in an embodiment, step 502 may alternatively comprise identifying tags associated with components of a process control system that are physically located within (or in a defined vicinity of) the field of view of an image acquisition device. In an embodiment the identified control system components or tags associated with such components may be associated with or mapped to the image acquisition device under consideration.

Step 504 comprises optionally associating one or more of the identified process control system components or tags with specific regions of the field of view—such that said control system components or tags are located within (or in a defined vicinity of) the corresponding sub-regions.

In an embodiment, one or both of steps 502 and 504 may be implemented during configuration of the process control system, the image acquisition device or a surveillance system associated with the process environment.

Step 506 comprises analyzing an image frame received from the image acquisition device—to detect the existence or occurrence of anomalies within a field of view of said image acquisition device.

Step 508 comprises responding to detection of an anomaly based on image analysis of the image frame, by selecting one or more control system components or tags associated with a region of the field of view (or associated with the field of view or image acquisition device as a whole) within which the anomaly has been detected.

Step 510 comprises analyzing process control parameters associated with the selected one or more components or tags for identification of any unexpected or anomalous state changes. In an embodiment of the invention the analysis of process control parameters may involve comparison of detected process control parameters against one or more predefined, expected or predicted parameter values or parameter states.

Step 512 comprises identification of an anomaly based on the results of the image analysis at step 506 and/or the analysis of process control parameters at step 510. In an embodiment, the identification result at step 512 is based entirely on detection of an anomaly at step 510. In another embodiment, identification of an anomaly at step 512 may involve combining the results of the anomaly detection based on the image analysis at step 506 and anomaly detection based on process control parameters at step 510.

In a specific embodiment, identification of an anomaly at step 512 may involve a combination of first and second confidence scores respectively resulting from anomaly analyses of steps 506 and 510, wherein the step of combining said first and second confidence scores and interpreting the combined results may be based on a predefined set of rules for combining confidence scores or interpreting results of two or more confidence scores.

FIG. 6 illustrates an exemplary embodiment of the invention, comprising a further verification step in connection with the image analysis based anomaly detection discussed above.

Step 602 comprises receiving an image frame from an image acquisition device. The image frame may be analyzed for detecting existence or occurrence of anomalies within the field of view of said image acquisition device, in accordance with any of methods described above.

Step 604 comprises responding to the image analysis based detection of an anomaly in an image frame, by analyzing process control parameter(s) corresponding to process control components or tags that have been associated with a field of view of the image acquisition device. In an embodiment the association between process control components or tags and a field of view of the image acquisition device may be achieved in accordance with method steps 502 and/or 504 as discussed above.

Step 606 comprises determining whether changes in process control parameters or in parameter states corresponding to the identified components or tags, is a result of a deliberate, intended or legitimate operator action, or a result of an intended function of the process control system under consideration. Responsive to determining that the change in process control parameters or in parameter states corresponding to said components or tags is not the consequence of a deliberate, intended or legitimate operator action and/or not a result of an intended function of the process control system under consideration, step 608 comprises identifying existence of an anomaly or occurrence of an anomalous event.

FIG. 7 illustrates an exemplary process environment 700 configured to implement the methods of the present invention.

Process environment 700 comprises a plurality of image acquisition devices 702a to 702n, each communicatively coupled to a corresponding image processing node 704a to 704n. Each of image processing nodes 704a to 704n is connected to image analyzer 708—which image analyzer is configured to implement image based anomaly detection in accordance with any of the methods described above.

Image analyzer 708 may further be communicatively coupled with location database 706, which database may comprise a repository of data that stores information correlating (i) image acquisition devices that have overlapping fields of view, (ii) specific field of view sub-regions that are common to a plurality of image acquisition devices, and (iii) specific control system components (or corresponding tags) that are located within (or in the vicinity of) one or more fields of view of corresponding image acquisition devices.

Image analyzer 708 may additionally be communicatively coupled with control system monitor 710—which control system monitor 710 may be configured to monitor control system parameters and data states of control system components (or corresponding tags) for any of the purposes discussed above.

Image analyzer 708 and control system monitor 710 may additionally be communicatively coupled with anomaly detector 712. Anomaly detector 712 may be configured to detect existence of an anomaly or occurrence of an anomalous event in accordance with any of the methods described above. Anomaly detector 712 may in turn be communicatively coupled with anomaly response controller 714, which anomaly response controller 714 may be configured to trigger or implement any one or more predefined responses to detection of an anomaly within the process environment—including without limitation, by generation or communication of a notification, flag or alert regarding detection of an anomaly.

FIG. 8 illustrates an exemplary computing system for implementing the present invention.

The computing system 802 comprises one or more processors 804 and at least one memory 806. Processor 804 is configured to execute program instructions—and may be a real processor or a virtual processor. It will be understood that computing system 802 does not suggest any limitation as to scope of use or functionality of described embodiments. The computing system 802 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 802 in accordance with the present invention may include one or more servers, desktops, laptops, tablets, smart phones, mobile phones, mobile communication devices, tablets, phablets and personal digital assistants. In an embodiment of the present invention, the memory 806 may store software for implementing various embodiments of the present invention. The computing system 802 may have additional components. For example, the computing system 802 may include one or more communication channels 808, one or more input devices 810, one or more output devices 812, and storage 814. An interconnection mechanism (not shown) such as a bus, controller, or network, interconnects the components of the computing system 802. In various embodiments of the present invention, operating system software (not shown) provides an operating environment for various softwares executing in the computing system 802 using a processor 804, and manages different functionalities of the components of the computing system 802.

The communication channel(s) 808 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 810 may include, but is not limited to, a touch screen, a keyboard, mouse, pen, joystick, trackball, a voice device, a scanning device, or any another device that is capable of providing input to the computing system 802. In an embodiment of the present invention, the input device(s) 810 may be a sound card or similar device that accepts audio input in analog or digital form. The output device(s) 812 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computing system 802.

The storage 814 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computing system 802. In various embodiments of the present invention, the storage 814 may contain program instructions for implementing any of the described embodiments.

In an embodiment of the present invention, the computing system 802 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computing system 802. The method described herein is typically implemented as a computer program product, comprising a set of program instructions which is executed by the computing system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computing system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in particular embodiment specifically contemplated, is intended to be practiced in the absence of any element which is not specifically disclosed herein.

The invention claimed is:

1. A method for image based detection of occurrence of an anomalous event within a process environment, the method comprising the steps of:
   receiving a first set of information from a first image acquisition device configured to image at least a part of the process environment, the first set of information comprising image information extracted from a first image frame generated at the first image acquisition device;
   analyzing the first set of information for determining whether the first image frame images an occurrence of an anomalous event;
   responsive to determining that the first image frame images an occurrence of an anomalous event:
      receiving a second set of information generated at a second device, wherein the second set of information represents a state of the process environment; and
      analyzing the second set of information for determining whether an anomalous event has occurred; and
   generating an anomaly identification decision based at least on output from analysis of the second set of information, wherein:
   the second device is a second image acquisition device configured to image at least a part of the process environment;
   the first image acquisition device has a first field of view and the second image acquisition device has a second field of view, such that said first field of view and said second field of view intersect at a field of view overlap region;
   the second set of information comprises image information extracted from a second image frame generated at the second image acquisition device; and
   analysis of the second set of information for determining an occurrence of an anomalous event comprises determining whether the second image frame images occurrence of an anomalous event within the field of view overlap region.

2. The method as claimed in claim 1, wherein at least the second image acquisition device is selectively operable within one of a first anomaly detection configuration and a second anomaly detection configuration; and
   wherein a first anomaly detection score requirement associated with the first anomaly detection configuration is selectively higher than a second anomaly detection score requirement associated with the second anomaly detection configuration.

3. The method as claimed in claim 2, wherein the second image acquisition device is configured to implement the second anomaly detection configuration responsive to a determination that the first image frame images occurrence of an anomalous event.

4. The method as claimed in claim 1, wherein analysis of the first set of information includes one or more of trajectory analysis, object based analysis, pixel based analysis, and comparison of the first set of information with data received from combustible gas sensors, photoionization detectors or electrochemical sensors.

5. The method as claimed in claim 1, wherein analysis of any of the first set of information or the second set of information includes analyzing pixel information within a plurality of sub-regions within an image frame under analysis, and generating a pixel activity score for each of the plurality of sub-regions.

6. The method as claimed in claim 5, wherein:
pixel activity scores corresponding to the plurality of sub-regions are recorded within an activity score matrix; and
generating the anomaly identification decision is based on pixel activity scores corresponding to one or more of the plurality of sub-regions within the activity score matrix.

7. The method as claimed in claim 1, wherein generating the anomaly identification decision is additionally based on a determination whether a detected anomalous event is influenced by an operator actuated event or process control system actuated event.

8. The method as claimed in claim 1, wherein:
analysis of the first set of information outputs a first score;
analysis of the second set of information outputs a second score; and
the generated anomaly identification decision is based on both of the first and second scores.

9. The method as claimed in claim 1, wherein selection of the second set of information is based on timestamps respectively associated with the first set of information and the second set of information.

10. A method for image based detection of occurrence of an anomalous event within a process environment, the method comprising the steps of:
receiving a first set of information from a first image acquisition device configured to image at least a part of the process environment, the first set of information comprising image information extracted from a first image frame generated at the first image acquisition device;
analyzing the first set of information for determining whether the first image frame images an occurrence of an anomalous event;
responsive to determining that the first image frame images an occurrence of an anomalous event:
receiving a second set of information generated at a second device, wherein the second set of information represents a state of the process environment; and
analyzing the second set of information for determining whether an anomalous event has occurred; and
generating an anomaly identification decision based at least on output from analysis of the second set of information, wherein:
the second device is a sensor configured to measure state changes corresponding to at least one process control parameter within the process environment;
the second set of information comprises state change information received from the sensor; and
analysis of the second set of information for determining whether an anomalous event has occurred, comprises analysis of measured state changes corresponding to the at least one process control parameter.

11. A system for image based detection of occurrence of an anomalous event within a process environment, the system comprising:
at least one processor;
at least one processor implemented analyzer configured to:
receive a first set of information from a first image acquisition device configured to image at least a part of the process environment, the first set of information comprising image information extracted from a first image frame generated at the first image acquisition device;
analyze the first set of information for determining whether the first image frame images an occurrence of an anomalous event;
responsive to determining that the first image frame images an occurrence of an anomalous event:
receive a second set of information generated at a second device, wherein the second set of information represents a state of the process environment; and
analyze the second set of information for determining whether an anomalous event has occurred; and
an anomaly detector configured to generate an anomaly identification decision based at least on output from analysis of the second set of information, wherein:
the second device is a second image acquisition device configured to image at least a part of the process environment;
the first image acquisition device has a first field of view and the second image acquisition device has a second field of view, such that said first field of view and said second field of view intersect at a field of view overlap region; and
the at least one processor implemented analyzer is configured such that:
the second set of information comprises image information extracted from a second image frame generated at the second image acquisition device; and
analysis of the second set of information for determining an occurrence of an anomalous event comprises determining whether the second image frame images occurrence of an anomalous event within the field of view overlap region.

12. The system as claimed in claim 11, wherein at least the second image acquisition device is selectively operable within one of a first anomaly detection configuration and a second anomaly detection configuration; and
wherein a first anomaly detection score requirement associated with the first anomaly detection configuration is selectively higher than a second anomaly detection score requirement associated with the second anomaly detection configuration.

13. The system as claimed in claim 12, wherein the second image acquisition device is configured to implement the second anomaly detection configuration responsive to a determination that the first image frame images occurrence of an anomalous event.

14. The system as claimed in claim 11, wherein the at least one processor implemented analyzer is configured such that analysis of the first set of information includes one or more of trajectory analysis, object based analysis, pixel based analysis, and comparison of the first set of information with data received from combustible gas sensors, photoionization detectors or electrochemical sensors.

15. The system as claimed in claim 11, wherein the at least one processor implemented analyzer is configured such that analysis of any of the first set of information or the second set of information includes analyzing pixel information within a plurality of sub-regions within an image frame under analysis, and generating a pixel activity score for each of the plurality of sub-regions.

16. The system as claimed in claim 11, wherein:
the at least one processor implemented analyzer is configured such that:
analysis of the first set of information outputs a first score; and
analysis of the second set of information outputs a second score;
and the anomaly detector is configured such that the generated anomaly identification decision is based on both of the first and second scores.

17. The system as claimed in claim 11, wherein the at least one processor implemented analyzer is configured such that selection of the second set of information is based on timestamps respectively associated with the first set of information and the second set of information.

* * * * *